United States Patent [19]
Chen et al.

[11] Patent Number: 5,764,329
[45] Date of Patent: Jun. 9, 1998

[54] CHIRAL SMECTIC LIQUID CRYSTAL PHASE SPATIAL LIGHT MODULATOR FOR UNPOLARIZED LIGHT IN WHICH A REFLECTOR IS AT AN ANGLE TO THE OUTPUT SURFACE OF THE LIQUID CRYSTAL CELL

[75] Inventors: Diana Chen, Gilbert; Phil Wright, Scottsdale; Karen E. Jachimowicz, Laveen, all of Ariz.

[73] Assignee: Motorola, Inc., Schaumburg, Ill.

[21] Appl. No.: 651,189

[22] Filed: May 17, 1996

[51] Int. Cl.$^6$ .................................................. G02F 1/13
[52] U.S. Cl. ........................ 349/193; 349/196; 349/202
[58] Field of Search ............................. 349/5, 6, 7, 8, 349/11, 25, 26, 27, 28, 29, 30, 58, 171, 172, 193, 196, 202, 113; 359/291

[56] References Cited

U.S. PATENT DOCUMENTS

| | | | |
|---|---|---|---|
| 4,799,776 | 1/1989 | Yamazaki et al. | 349/113 |
| 5,134,516 | 7/1992 | Lehureau et al. | 359/301 |
| 5,467,215 | 11/1995 | Lebby et al. | 349/58 |
| 5,539,554 | 7/1996 | Lebby et al. | 349/113 |
| 5,543,958 | 8/1996 | Lebby et al. | 349/58 |
| 5,552,912 | 9/1996 | Sharp et al. | 349/171 |

FOREIGN PATENT DOCUMENTS

2304934  3/1975  France .................................. 349/202

*Primary Examiner*—William L. Sikes
*Assistant Examiner*—Walter Malinowski
*Attorney, Agent, or Firm*—Eugene A. Parsons

[57] ABSTRACT

A phase spatial light modulator composed of a liquid crystal cell and a reflective element. The modulator capable of receiving and modulating substantially 100% of unpolarized light impinging thereupon. The modulator intended for use within an electro-optical system additionally composed of a light source, driver/control circuitry and an optional optical magnification system. In operation, an external stimulus is applied, such as a voltage supplied by an external power source, thereby changing the phase of light emitted therethrough, generating two beams of light traveling in different directions. The first beam of light impinges upon the reflective element and is reflected to travel in the same directional path as the second beam of light.

16 Claims, 9 Drawing Sheets

CHIRAL SMECTIC LIQUID CRYSTAL PHASE SPATIAL LIGHT MODULATOR FOR UNPOLARIZED LIGHT IN WHICH A REFLECTOR IS AT AN ANGLE TO THE OUTPUT SURFACE OF THE LIQUID CRYSTAL CELL

FIELD OF THE INVENTION

The present invention pertains to the field of optical scanners, or beam steerers, and more particularly to the modulation of unpolarized light to generate a resultant change in the directional path of light passing therethrough.

BACKGROUND OF THE INVENTION

Many electronic devices utilized today are fabricated using various light sources. Of concern in the development of newer and more advanced electronic devices of this sort, is the ability to maintain minimal power requirements and low manufacturing costs. One method of achieving these results is to utilize scanning or beam steering techniques to achieve a resultant change in directional path of the light emitted by the light source, generally composed of a plurality of light emitting devices. This change in directional path enables fewer light emitting devices, thus a smaller active area, to produce a desired result, that appears to be formed from a greater number of light emitting devices or larger active area. Electro-optical devices that utilize this type of scanning or beam steering principles are found in visual display systems. In addition, scanning or beam steering can be utilized in other electro-optical devices, such as target tracking devices, weaponry, optical communications devices, optical computing devices, optical storage devices, printing devices, image scanning devices, or the like.

The human visual system is a complex system with a great ability to absorb vast amounts of information originating in many varying formats, including visual displays. Visual displays are found in varying sizes and forms in today's world, displaying many types of information, from large visual display screens announcing scheduling information found in airports, to small visual displays, such as those incorporated into pocket calculators. Of concern in the reduction in the size of visual displays, specifically those utilized in portable electronic devices, such as portable communications equipment, or the like, is the quality of the output and the maintenance of minimal power requirements and low manufacturing costs.

One alternative method of fabricating an electro-optical system that utilizes minimal power is to incorporate scanning techniques to create a desired result from a minimum number of active light emitting devices. Of relevance in the reduction in size of visual displays utilizing scanning techniques, and the maintenance of resolution quality, is the human visual system's ability to process and integrate information, and the speed at which the visual system is able to do so. The human visual system can process information no faster than approximately 60 Hz. Therefore, an image that is projected and scanned within 1/60th of a second to varying positions within a visual display is seen by the eyes of the viewer as one enlarged integrated image. As an example, by moving an image of an "A" to six different locations within a visual display, at a speed of 60 Hz, the viewer will see one integrated image composed of six "A"s. If the image is simultaneously content modulated, for example, the images are of six letters "A", "B", "C", "D", "E" and "F" that are individually and sequentially moved to six varying positions at a speed of 60 Hz., the viewer will see one integrated image composed of the six letters. This process, more commonly known as time-multiplexed imagery, can be utilized in the field of display technology through the use of optical scanners or beam steerers, and more specifically in the development of enhanced resolution miniature visual displays.

Optical scanning, or beam steering, devices are utilized today not only in visual displays, but in other electronic devices, such as target tracking devices, weaponry, optical communications devices, optical computing devices, optical storage devices, printing devices, image scanning devices, or the like. These scanning devices can be found in many forms, most commonly electro-mechanical scanners incorporating mirrors, such as galvanometric scanners and polygonal scanners. These types of electro-mechanical scanners are commonly quite large in size, therefore not amenable to the incorporation into devices that are small, lightweight, operate with low power consumption and are meant to be portable in nature. In addition, mechanical scanners are complex and thus expensive to manufacture and in many instances utilize great amounts of power during operation.

Many of the present scanning devices, in particular those utilizing chiral smectic liquid crystal material, are only capable of steering circularly polarized light. In these scanning devices, unpolarized light must first be changed into linearly polarized light through the use of the polarizer. In this instance, 100% of the light is incident upon the polarizer. A quarter-wave plate is positioned between the polarizer and the modulator, thereby circularly polarizing the linearly polarized light. During operation, approximately 50% of the light, and/or energy, is transmitted therethrough the polarizer and the quarter-wave plate, while the remaining 50% is absorbed by the polarizer. This structure allows for circularly polarized light to enter the modulator and undergo a phase modulation. Because incident unpolarized light must first be linearly polarized, then circularly polarized prior to entering the modulator, there is an increase in manufacturing costs and difficulty because of the required optical alignment of the linear polarizor, the quarter-wave plate, and the chiral smectic liquid crystal phase spatial light modulator.

Thus, there is a need for a small scanning device that allows for the scanning, thus steering, of 100% of unpolarized light passing therethrough, for use in electro-optical systems, such as those incorporated into miniature visual displays, target tracking devices, weaponry, optical communications devices, optical computing devices, optical storage devices, printing devices, image scanning devices, or the like.

Accordingly, it is highly desirable to provide for a scanning device, that utilizes a liquid crystal phase spatial light modulator that has included as a part thereof, a reflective element, such as a perfect mirror, for phase modulation, thereby providing for the scanning, and thus steering, of 100% of the unpolarized light passing therethrough.

It is a purpose of the present invention to provide a new and improved scanning system that utilizes a liquid crystal phase spatial light modulator that incorporates a reflective element thereby capable of spatially modulating 100% of the unpolarized light incident thereupon.

It is another purpose of the present invention to provide a chiral smectic liquid crystal phase spatial light modulator that incorporates a reflective element for use in electro-optical systems, generally utilized in visual displays, target tracking devices, weaponry, optical communications devices, optical computing devices, optical storage devices, printing devices, image scanning devices, or the like.

It is a further purpose of the present invention to provide a chiral smectic liquid crystal phase spatial light modulator that incorporates a reflective element for use in a new and improved visual display system for display resolution enhancement, thereby allowing for the incorporation of the scanner into miniature visual displays.

It is yet another purpose of the present invention to provide for a method of scanning 100% of unpolarized light emitted by an image source utilizing a chiral smectic liquid crystal phase spatial light modulator including a reflective element and an applied external stimulus, that can be incorporated into a miniature visual display while maintaining resolution quality of the image viewed.

SUMMARY OF THE INVENTION

The above problems and others are substantially solved and the above purposes and others are realized in a chiral smectic liquid crystal phase spatial light modulator or modulating system for unpolarized light. The modulator is composed of a chiral smectic liquid crystal phase spatial modulating cell, a reflective element, and driver/control circuits. The modulator is intended for incorporation into an electro-optical system further composed of a light source, driver/control circuits, and optional optical elements.

In the preferred embodiment the phase spatial light modulator utilizes a scanning cell that has attached to, formed as a part thereof, or positioned spatially thereto, a reflective element, such as a perfect mirror, or the like. During operation, unpolarized light enters the modulator of the present invention and undergoes a phase modulation within the scanning cell, thereby changing the direction of travel of the light passing therethrough. The modulator is capable of operation in either a transmissive mode or a reflective mode. Upon exiting the scanning cell, the light is split into two light beams, traveling in two separate paths. One beam of light impinges upon the reflective element, while the second beam of light travels in a direction generally away from the reflective element. The reflective element that is provided as a part of the modulator is positioned at a specific angle to an output surface of the scanning cell, such angle being dependent upon the mode of operation and the position of the light source. The beam of modulated light that impinges upon the reflective element, is reflected by a reflective surface, undergoing a second change in direction of travel. Once reflected, the light travels in a directional path parallel to the beam of modulated light exiting the scanning cell that does not impinge upon the reflective element. This type of scanning and reflecting allows for substantially 100% of the light incident upon the modulating cell to be spatially modulated and travel in one directional path.

The modulator, or scanner, is fabricated to spatially modulate the phase of substantially 100% of the light generated by an image or light source, generally composed of an array of light emitting devices, most commonly light emitting diodes or vertical cavity surface emitting lasers (VCSELs), thereby generating a resultant change in the directional path of the light, which in a display system is viewable as an enhanced resolution integrated image. It should be understood that alternative light or image generating devices can be utilized such as organic light emitting diodes (LEDs), cathode ray tubes (CRTs), field emission displays (FEDs), electroluminescent displays, plasma displays, liquid crystal displays (LCDs), etc., but the general term "light emitting devices" will be utilized throughout this disclosure for the sake of simplicity.

In general, the chiral smectic liquid crystal phase spatial light modulator of the present invention, hereinafter also referred to as a liquid crystal modulator, or scanner, serves to spatially modulate the phase of substantially 100% of the light emitted by the image source, thus steering the directional path of the light passing therethrough. This is accomplished based on the principle that the structural organization of the molecules, which compose the chiral smectic liquid crystal material contained within the scanning cell, is not rigid, meaning that the molecules can be easily reoriented as a direct result of an external stimulus. This exertion of an external stimulus on the liquid crystal material results in the reorientation of the molecular structure of the liquid crystal material, thereby causing the light passing therethrough to undergo a phase change. Simply stated, the phase change is a function of the external stimulus, or in the present invention, the voltage applied, yet is not necessarily proportional. It should be understood that varying amounts of voltage applied to the liquid crystal material, will result in varying phase modulations, thus varying the directional travel, or angle, of the light passing therethrough.

Of concern in the operation of some liquid crystal scanners, or beam steerers, is the degree of lost energy due to the absorption of 50% of the energy by standard polarizers. In most instances, light must be linearly polarized before going through the liquid crystal scanner so that all light is steered to the same direction. The chiral smectic liquid crystal scanner of the present invention is fabricated to allow for the passage of substantially 100% of unpolarized light to pass therethrough.

During the operation of the chiral smectic liquid crystal modulator of the present invention, a voltage(s) is applied to the scanner, thereby changing the molecular orientation of the chiral smectic liquid crystal material contained within the liquid crystal cell. This reorientation of the molecular structure of the chiral smectic liquid crystal material results in a change in directional travel of the light, and upon reflection by the reflective element of a portion of the light exiting the scanner. In the instance where the modulator is incorporated into a display system, this change is converted into a visible change in fill factor and/or number of pixels of the generated resultant integrated image when viewed by the observer due to the directional change of light passing therethrough. A stacked liquid crystal cell orientation is utilized, thereby spatially modulating substantially 100% of the generated light waves to produce a directional change and generate the resultant path of light and/or a resultant integrated display image viewable by the observer. In a display, the resultant integrated image appears to have higher resolution, and higher fill factor, yet the number of active pixels on the image source remains the same.

In the preferred embodiment, the chiral smectic liquid crystal scanner is fabricated as a single liquid crystal cell having attached thereto, integrally formed therewith, or spatially positioned therefrom, a reflective element. More specifically, the reflective element is aligned at an angle Ø to the surface of the scanning cell through which the light exits. The chiral smectic liquid crystal scanner is positioned within a miniature visual display system and operates in a transmissive mode or a reflective mode. When operating in a transmissive mode, the liquid crystal cell is positioned so that the light generated by the array of light emitting devices passes directly through the modulator, is scanned, whereby the light is split into two light beams. Upon further reflection of one of the light beams off the reflective element, a resultant unidirectional path of light is created through phase modulation. When the modulator is operating in the reflective mode, the liquid crystal cell has formed on a surface a reflective element or alternatively contains reflective properties, and is positioned so that the light generated by the array passes through the scanner twice. During operation the scanner is positioned so that the light generated by the array of light emitting devices enters the liquid crystal cell and exits the liquid crystal cell through the same surface. In doing so, the light is scanned, thereby causing the exiting light to be split into two beams, one beam being reflected to create a resultant path of light, or in a display an integrated image, through phase modulation.

The modulator operates by scanning the light source, generally by scanning sub-pixels or devices, pixel or device groups, and/or sub-arrays to generate a resultant path of light through phase modulation. The scanning, or beam steering, serves to spatially modulate the phase, and direction of travel, of the light. The number of active pixels or devices on the light source remains the same, in that no additional active area, devices, or pixels, etc. are being utilized, yet in a visual display the resolution and fill factor of the generated resultant integrated image is dramatically increased through the scanning process and when incorporated into other devices utilizing beam steering, the modulating of the phase of light passing therethrough allows for a decreased active area of the light source.

BRIEF DESCRIPTION OF THE DRAWINGS

The novel features believed characteristic of the invention are set forth in the claims. The invention itself, however, as well as other features and advantages thereof will be best understood by reference to detailed descriptions which follow, when read in conjunction with the accompanying drawings, wherein:

DETAILED DESCRIPTION OF THE PREFERRED EMBODIMENT

During the course of this description, like numbers are used to identify like elements according to the different figures that illustrate the invention. The present invention is based on utilizing individually addressable visible light emitting devices formed in a one-dimensional or two-dimensional array, that in combination with driver/control circuitry and optical elements compose a light emitting device, light source, or image source, of the present invention. To increase the resolution for a given number of light emitting devices or to reduce the number of light emitting devices needed to achieve a desired result, scanning techniques utilizing a chiral smectic liquid crystal phase spatial light modulator, hereinafter also referred to as a chiral smectic liquid crystal scanner, are employed. In a visual display system, the light emitting device serves as the image source whereby a resulting integrated image is formed by scanning portions or elements of the array of light emitting devices, through the liquid crystal cell, and subsequently reflecting one-half of the light emitted therethrough, thereby spatially modulating the phase of the light emitted by that portion, so that all light travels in one uniform direction. This phase modulation serves to change the directional travel and in essence "moves" the light to another portion of the display. This scanning action forms what appears to the observer to be a high resolution resultant integrated image. Those skilled in the art will appreciate that the modulating, or scanning, allows a full page display to be created from a much smaller number of display devices than is necessary to generate the full page display. The resultant integrated image is viewable as one of a direct view image, a miniature virtual image, or a projected image. In addition, it should be understood that the modulator of the present invention is intended for use in other instances not incorporating a visual display, namely for modulating the phase of light emitted from a light source, generally utilized in target tracking devices, weaponry, optical communications devices, optical computing devices, optical storage devices, printing devices, image scanning devices, or the like.

The scanning process utilized in the present invention is based on the principle of phase modulation, thereby altering the directional path of light emitted by portions or elements of the array of light emitting devices. Of concern in the generation of a resultant integrated image utilizing scanning techniques or resultant change in the path of light, is the loss of energy, or light, due to the polarization properties. In general, chiral smectic liquid crystal scanners utilized today only scan or steer circularly polarized light, therefore unpolarized light must be changed to linearly polarized light, through the use of a polarizer, and then to circularly polarized light, through the user of a quarter-wave plate, before it will pass through the chiral smectic liquid crystal scanner. The problem then exists that only 50% of the light incident upon the polarizer, and/or scanner, passes therethrough, while the remaining 50% is absorbed by the polarizer.

In the preferred embodiment of the chiral smectic liquid crystal modulator of the present invention, substantially 100% of the light passes therethrough and is steered. The chiral smectic liquid crystal modulator is composed of a phase modulating cell, more specifically a liquid crystal cell, having attached thereto, integrally formed therewith, or spatially positioned therefrom, a reflective element, aligned at an angle Ø to the output surface of the liquid crystal cell through which the light emitted therethrough exits. The phase modulation of the light passing therethrough the liquid crystal cell, in conjunction with the reflection of a portion of that light, allows for substantially 100% of unpolarized light to be steered in a directional path.

In the preferred embodiment, the phase modulating cell, or more specifically the liquid crystal cell is composed of a plurality of liquid crystal scanner pixels, to which an external stimulus is applied, thereby altering the molecular orientation of the liquid crystal material contained therein and resulting in a phase modulation of the light passing therethrough. More specifically, during operation, the liquid crystal pixels of the chiral smectic liquid crystal cell function as variable-orientation half-wave retarders. The phase modulation of the incident light, emitted by the light source generally in a small cone, is implemented by rotation of the optical axis of the liquid crystal molecules which compose the liquid crystal pixels, in a plane transverse to the propagation of light. Unpolarized light can be thought of as the superposition of left and right handed polarized light which has no phase correlation. On transmission through the liquid crystal cell, the circularly polarized incident light undergoes a handedness change, experiencing a phase modulation of opposite signs, thus receiving a phase change equal to twice the rotation of the molecules defined within the pixels of the liquid crystal cell. Unpolarized light is thus split into two directions upon exiting the retarder which are symmetric to the incident direction. The orientation of the optical axis of each of the liquid crystal molecules, contained within the liquid crystal cell, is individually controlled by the applied voltage. The liquid crystal pixels, or beam steering elements, defined by the plurality of liquid crystal molecules, are arranged in the liquid crystal cell as individually controlled elements and the deflection of the beam is accomplished by setting the phase of each element. A drive scheme is chosen so that the phase function across the plurality of pixels represents a staircase array which approximates a blazed grating. This resulting phase modulation allows for the image or light source, having minimal pixel or device numbers and low fill factor, in combination with the liquid crystal modulator composed of the liquid crystal cell and the reflective element, to generate in a visual display, an integrated image that appears to be composed of a much greater number of pixels, or in a target tracking device, optical communications, computing or storage device, printing device, image scanning device, a resultant change in directional path of the light.

As previously stated, the purpose of this disclosure is to provide for a chiral smectic liquid crystal modulator, or scanner, to be utilized in a miniature visual display system, or an electro-optical system, composed of a light emitting device, the modulator, driver/control circuitry, and a plurality of optical elements. In the preferred embodiment, the use of the liquid crystal modulator to bring about the phase modulation of the light emitted by the light emitting device, allows for the system to remain small in size and permits it to be incorporated into miniature visual displays or portable electronics equipment, such as weaponry or tracking devices, optical communicating, computing and storage devices, printing devices, image scanning device, or the like. It should be understood that various sources of light or image generating devices can be utilized such as inorganic or organic light emitting diodes (LEDs), vertical cavity surface emitting lasers (VCSELs), cathode ray tubes (CRTs), field emission displays (FEDs), electroluminescent displays, plasma displays, liquid crystal displays (LCDs), etc., which may be formed in a two-dimensional array. It should also be understood that when utilizing these alternative light or image sources, that additional filters and/or optical elements may be required in addition to those described for the preferred embodiment. The general term "light emitting devices" will be utilized throughout this disclosure for the sake of simplicity.

Referring now to the accompanying illustrations, disclosed is the chiral smectic liquid crystal modulator, or scanner, device of the present invention. It should be understood that the preferred embodiment of the liquid crystal modulator of the present invention is generally composed of a liquid crystal cell and a reflecting element, such as a perfect mirror positioned at an angle Ø to the output surface of the liquid crystal cell through which the light exits. The specific structure of a liquid crystal cell, which may be utilized in the formation of the modulator, or scanner, is described with regard to FIGS. 1 and 2 illustrating in simplified partial cross-sectional views, a transmissive liquid crystal modulator, and a reflective liquid crystal modulator, respectively, each composed of a liquid crystal cell and a reflecting element.

Figure 1:
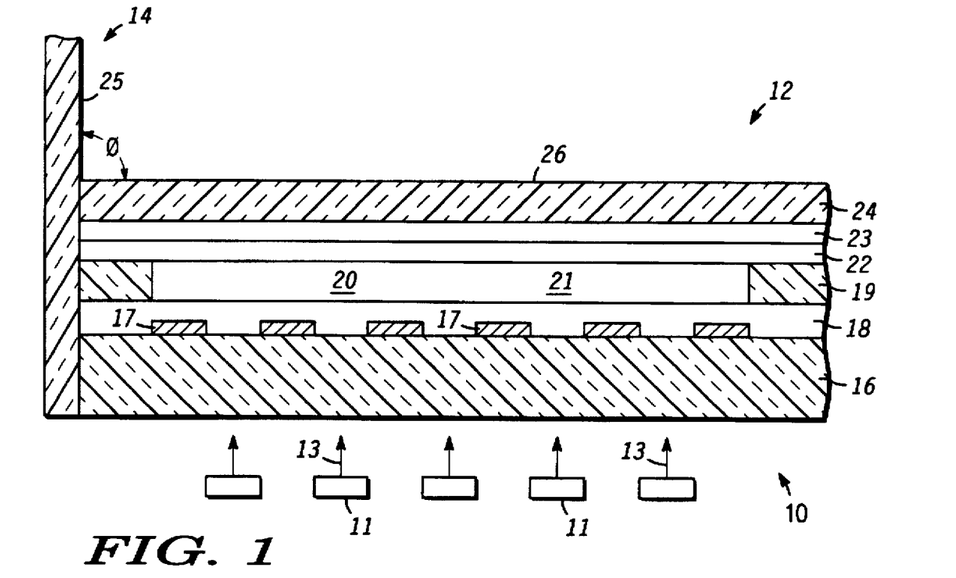
FIG. 1 is a simplified cross-sectional view of the structure of a transmissive chiral smectic liquid crystal cell of the present invention having attached thereto a reflective element.
Figure 2:
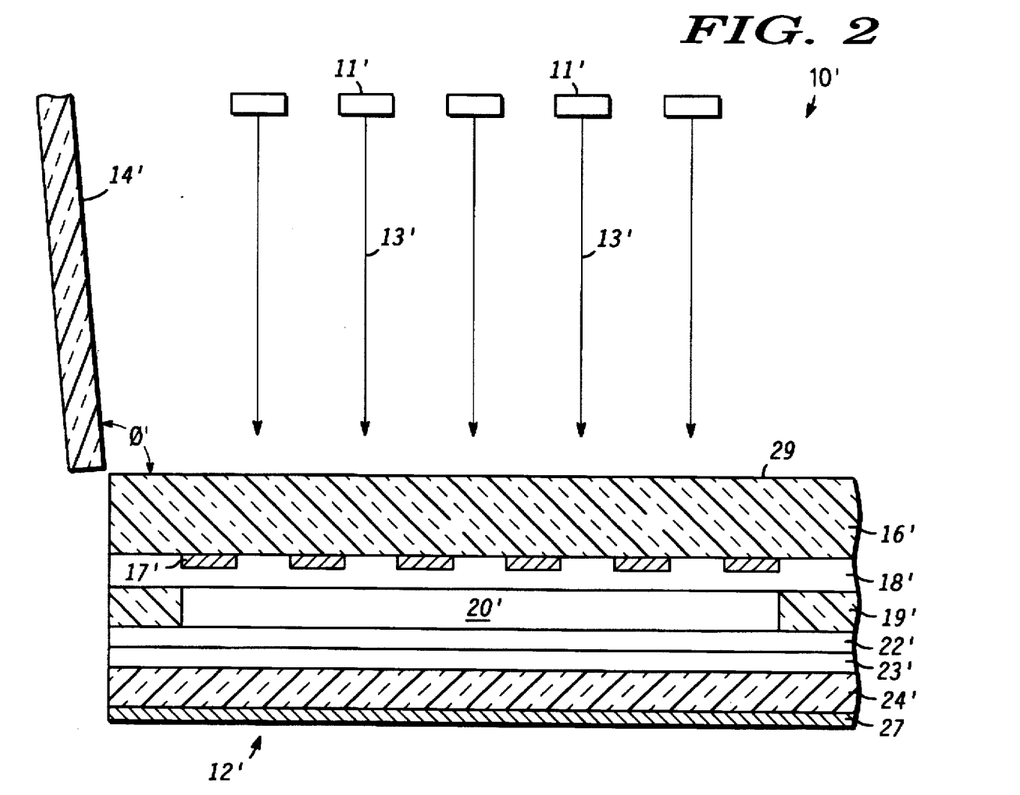
FIG. 2 is a simplified cross-sectional view of the structure of a reflective chiral smectic liquid crystal cell of the present invention having spatially positioned thereto a reflective element.

Referring specifically to FIG. 1, a simplified and enlarged partial sectional view of a transmissive liquid crystal modulator 10 composed of optically transparent material, is illustrated. Transmissive liquid crystal modulator 10 serves to function as a half-wave plate, more specifically a 0.5, 1.5, 2.5, etc. wave retarder, thereby causing a phase retardation of light passing therethrough on the order of a half-wave. The use of optically transparent material allows for the positioning of transmissive liquid crystal modulator 10 within a visual display or electro-optical system, allowing for the passage of light, emitted by the a plurality of light emitting devices 11, to pass directly through liquid crystal modulator 10. Transmissive liquid crystal modulator 10 is composed of a transmissive liquid crystal cell 12 and a reflective element 14. Transmissive liquid crystal cell 12 is generally fabricated in a stack formation and includes a substrate 16 formed of any convenient optically transparent material, such as glass. A plurality of control terminals (not shown) are formed adjacent the outer edges of substrate 16 and are in electrical communication with a plurality of control circuits formed of a plurality of layers of electrically conductive material (discussed presently). A first patterned electrically conductive material layer 17 is formed on an upper surface of substrate 16. First patterned electrically conductive material layer 17 is fabricated of an optically transparent material, such as indium tin oxide (ITO), thereby allowing light 13 impinging thereon to pass therethrough and defining an optically clear contact. A first molecular alignment, or orientation, layer 18 is positioned on the upper surface of transparent electrically conductive material layer 17. Alignment layer 18 serves to properly position and align the molecules comprising the liquid crystal material (discussed presently), so as to orient the molecules of liquid crystal cell 12 along an extraordinary optical axis when there does not exist any external stimulus, such as a voltage, acting upon the liquid crystal cell 12. More specifically, alignment layer 18 in conjunction with a second alignment layer (discussed presently) of liquid crystal cell 12 aid in aligning the molecules of liquid crystal cell 12 of modulator 10 of the present invention.

A generally tubular glass spacer 19 is fixedly attached to the upper surface of alignment layer 18 by any convenient means, such as adhesive, chemical bonding, growing and etching layers, etc. It will of course be understood that tubular glass spacer 19 could be formed in a variety of other embodiments such as beading, or the like and the present structure is illustrated only for purposes of this explanation. Tubular glass spacer 19 has an inner opening 21 defined therethrough, of sufficient size to encircle the array formed by the transparent electrode patterning. The cavity defined by opening 21 in tubular glass spacer 19, having internal opposed flat surfaces, in conjunction with the upper surface of alignment layer 18, is filled with a continuous layer of liquid crystal material 20, such as chiral smectic liquid crystal material.

A glass plate 24 has a second layer of electrically conductive material 23, to further define a second electrical contact. It should be understood that electrically conductive material layer 23 can alternatively also be patterned and would be configured orthogonal to electrically conductive material layer 17 so as to define a two-dimensional array of liquid crystal pixels. Layer 23 is formed on a lower surface of glass plate 24, and defines a second electrical contact which in conjunction with transparent electrically conductive material layer 17 and liquid crystal material 20 form a complete array of liquid crystal pixels, defined by the optically clear contact and a second contact. In the preferred transmissive embodiment, the second contact is formed from an optically transparent material, such as indium-tin-oxide or the like.

The electrically conductive material layers 17 and 23 are connected by a conductive lead to a bond pad (not shown) adjacent the outer edges of tubular glass spacer 19. The bond pad is then electrically connected to a bond pad on substrate 16 by any convenient means, such as wire bond, a feed through connector in the edges of tubular glass spacer 19 (not shown), etc. The bond pad is adapted to have applied thereto a common potential, such as ground or some fixed voltage, which in cooperation with various potentials applied to the contacts activates and serves to apply a voltage(s) to the liquid crystal material 20. A second alignment layer 22 is formed thereon a lower surface of patterned electrically conductive material layer 23. Liquid crystal material 20 is contained within the cavity defined by the upper surface of alignment layer 18, inner opening 21 of tubular glass spacer 19 and lower surface of alignment layer 22. It will be apparent to those skilled in the art that alignment layers 18 and 22 can be formed in separate or discrete layers that are simply positioned on opposing sides of tubular glass spacer 19 and sandwiched therebetween the remaining layers during assembly. It should be understood that while two separate alignment layers are disclosed alternative fabrication utilizing only one single alignment layer is anticipated by this disclosure.

A plurality of driver and control circuits (not shown) complete transmissive liquid crystal cell 12 which includes an array of liquid crystal pixels, each of which are individually addressable through connection pads. The driver and control circuits have data input terminals and control signal output terminals connected to the array of liquid crystal scanner pixels through a plurality of connection or bond pads, for activating and controlling each of the liquid crystal scanner pixels and applying a potential, or voltage, thereto. The electrical contacts of liquid crystal cell 12, when formed as a two-dimensional array, are formed in rows and columns and the addressing and switching circuitry (not shown) includes row and column electrical buses and electronic switches coupled to the contacts so that each contact, pixel, can be individually addressed. The row and column electrical buses are electrically connected to the plurality of connection pads formed adjacent the edges of glass plate 24 for external communication (addressing and controlling) with the individual pixels. To activate the reorientation of the molecular structure of a specific portion of liquid crystal material 20, the potential, or voltage, supplied by an external stimulus, such as an external power source, must be applied between the upper and lower contacts for that specific pixel or portion. With no potential applied, the liquid crystal material 20 is normally in a neutral condition, with molecular orientation, or long axis of the molecules, along the extraordinary optical axis ($N_e$), otherwise stated as the axis through which the light sees the extraordinary index of refraction, and any light passing therethrough would not undergo a phase modulation. While the present embodiment is explained using row and column drivers, it should be understood that in the alternative, thin film transistors (not shown) can be provided as an active drive device, positioned behind each liquid crystal scanner pixel. In addition, it should be understood that the chiral smectic liquid crystal cell 12 of the present invention can be fabricated so as to be non-pixelated, contain a single pixel, or many pixels formed in a one-dimensional or two-dimensional array.

The final element in liquid crystal modulator 10 is a reflective element 14, as illustrated in FIG. 1. Reflective element 14 is generally composed of a substrate having formed thereon a reflecting surface 25 composed of at least one layer of reflective material. Reflective material anticipated for use in this disclosure includes, but is not limited to, aluminum, gold, dielectric material, or the like. Reflective element 14 is positioned to align with a light output surface 26 of liquid crystal cell 12 at an angle Ø. More specifically, reflective element 14 is positioned to allow light 13 traveling from light output surface 26 of liquid crystal cell 12 in a directional path toward reflective element 14, to be reflected by reflecting surface 25, thus altering the directional path of light 13. It should be understood that reflective element 14 can be attached to liquid crystal cell 12, integrally formed therewith liquid crystal cell 12 or spatially positioned thereto liquid crystal cell 12.

Referring now to FIG. 2, illustrated is a simplified cross-sectional view of the structure of a reflective chiral smectic liquid crystal modulator 10' of the present invention composed of a reflective liquid crystal cell 12', having spatially positioned thereto a reflective element 14'. It should be noted that all components similar to the components illustrated in FIG. 1, are designated with similar numbers, having a prime added to indicate the different embodiment. Reflective liquid crystal modulator 10' serves to function as a quarter-wave plate, more specifically a 0.25, 1.25, 2.25, etc. wave retarder, therefor causing light 13' passing therethrough to undergo retardation on the order of a quarter-wave when passing through the liquid crystal material (discussed presently). In that light 13' passes through the liquid crystal material and is then reflected (discussed presently) back through the liquid crystal material, it undergoes a total retardation on the order of one-half wave. Reflective liquid crystal cell 12' is similar to the transmissive liquid crystal cell 12 previously described, except that there exist some element exhibiting a reflective property fabricated as part of cell 12'. Referring specifically to FIG. 2, illustrated is reflective liquid crystal cell 12', composed of an optically transparent substrate 16', optically transparent electrically conductive material layers 17' and 23', molecular alignment layers 18' and 22', glass spacer 19', liquid crystal material 20', and glass plate 24'. Liquid crystal cell 12' is generally fabricated in a stacked manner similar to transmissive liquid crystal cell 12 of FIG. 1. As with transmissive liquid crystal cell 12, during operation a voltage is applied to cell 12', thereby activating the liquid crystal material 20', thus modulating the phase of the light 13' passing therethrough according to potential applied.

In the preferred embodiment, incorporating two optically transparent electrically conductive material layers 17' and 23' as illustrated in FIG. 2, a separate reflective layer 27 is provided in the liquid crystal stack so that light 13' passing through liquid crystal material 20', is reflected back through liquid crystal material 20' and undergoes two phase modulations within the single liquid crystal cell 12'. Reflective layer 27 is formed of any convenient reflective material, such as aluminum, or the like. In an alternative embodiment, one of the layers of electrically conductive material, such as layer 23' is formed of a reflective material, such as aluminum, the contact itself serves to reflect light 13' impinging thereon and the need for a separate reflective layer is eliminated. In such an embodiment, the reflective electrically conductive material can be formed of aluminum or any reflective metal that can be conveniently patterned or positioned on the surface of glass plate 24' and which will reflect light impinging thereon, reflecting it back through liquid crystal material 20', undergoing a second phase modulation within a single cell 12'.

Liquid crystal modulator 10' includes a reflective element 14', as illustrated in FIG. 2. Reflective element 14' is generally composed similar to reflective element 14 of transmissive liquid crystal modulator 10, previously described. Reflective element 14' is positioned to align with a light output surface 26' of liquid crystal cell 12' at an angle ∅'. More specifically, reflective element 14' is positioned to allow light exiting from light output surface 26' of liquid crystal cell 12' in a directional path toward reflective element 14', to be reflected by reflective element 14', thus altering the directional path of the light 13'. As illustrated in FIG. 2, reflective element 14' is spatially positioned from liquid crystal cell 12'. It should be understood that reflective element 14' can alternatively be attached to liquid crystal cell 12' or integrally formed therewith liquid crystal cell 12'.

In yet another alternative embodiment (not shown), a reflective liquid crystal cell can be fabricated on a silicon chip, having patterned directly thereon electrically conductive material. The liquid crystal cell is essentially formed according to the above disclosed embodiment for reflective liquid crystal cell 12' in which reflective elements or layers are utilized in lieu of or in combination with the layers of electrically conductive material. In this embodiment, the drive circuitry is integrated with the scanner by forming a plurality of metal pads directly on an upper surface of a silicon chip having formed therein the driver circuitry.

Figure 3:
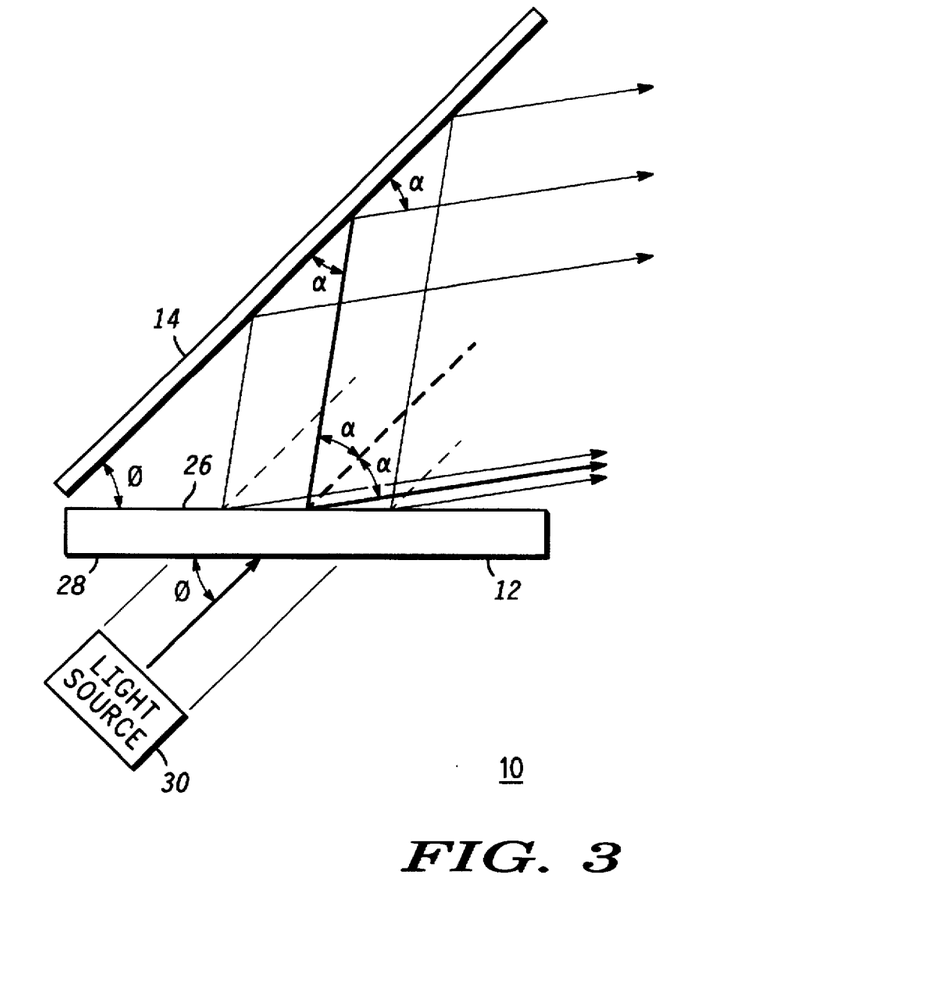
FIGS. 3, 4, and 5 are simplified schematic views of three configurations of the transmissive chiral smectic liquid crystal modulator of the present invention illustrating the spatial modulation and resultant directional travel of light passing therethrough.
Figure 4:
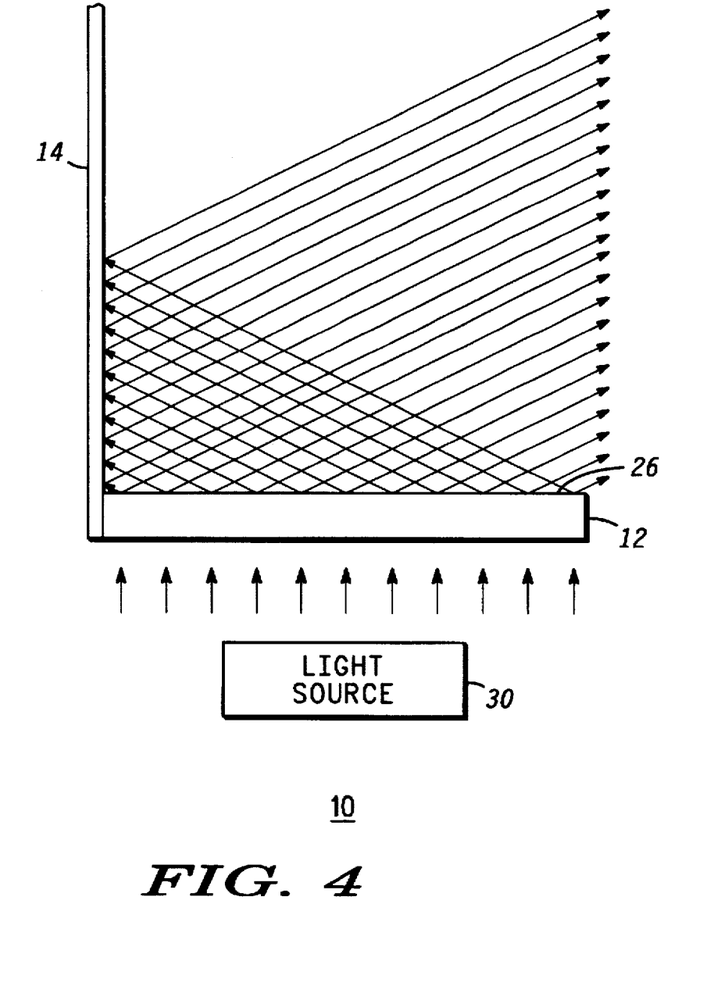
Figure 5:
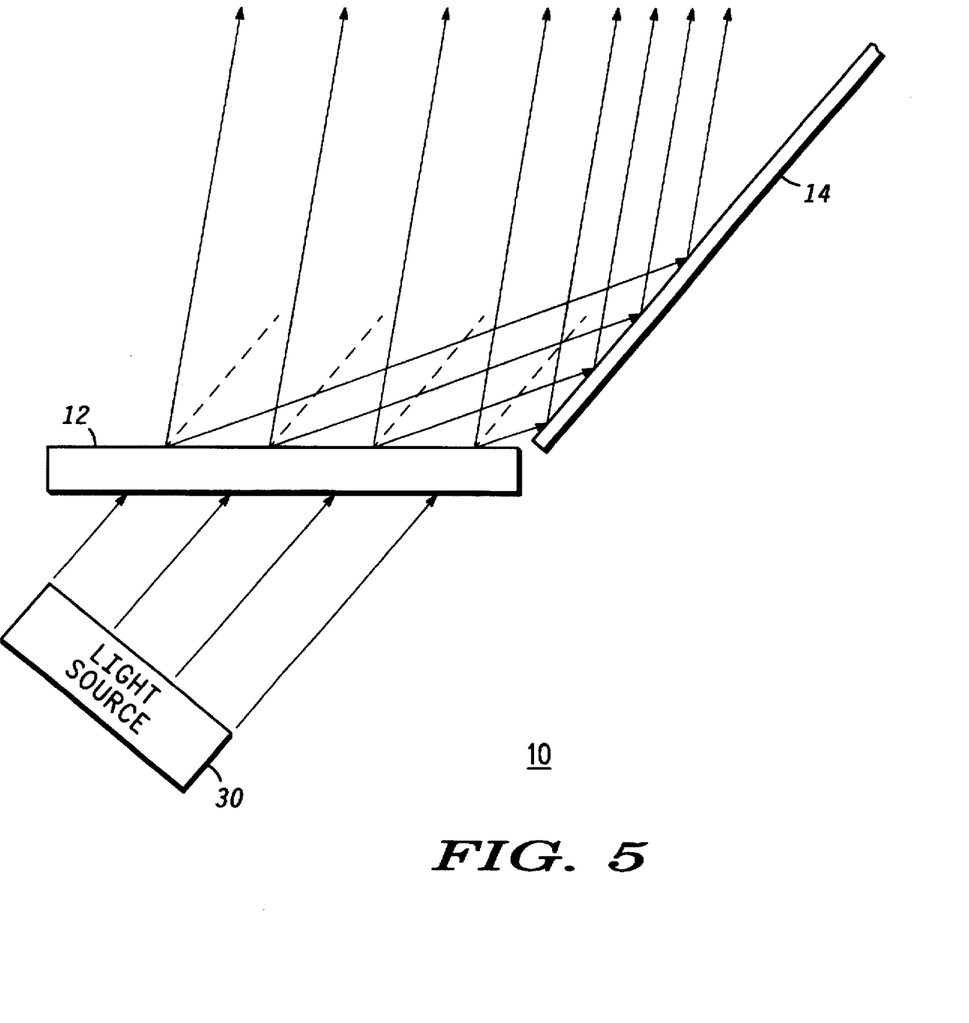

The liquid crystal phase spatial light modulator 10, and 10', of the present invention is intended for operation in one of a transmissive or a reflective mode, respectively, as previously stated. Referring now to FIGS. 3, 4, and 5, illustrated are varying configurations of transmissive liquid crystal modulator 10 when positioned within a visual electro-optical system (not shown). It should be understood that the proper configuration and alignment of the components of modulator 10 are dependent upon the positioning of the image or light source within the electro-optical system relative to the modulator 10.

Referring specifically to FIG. 3, illustrated is schematic diagram of the alignment and/or configuration of components of a electro-optical system, such as a visual display system, namely composed of a light source 30, liquid crystal cell 12 and reflective element 14. Light source 30 is generally comprised of a plurality of light emitting devices generally similar to light emitting devices 11 and 11' of FIGS. 1 and 2, and is positioned so that emitted light will impinge upon a light input surface 28 of transmissive liquid crystal cell 12 at an angle ∅ and pass therethrough, undergoing a phase spatial modulation as illustrated by the directional arrows. Reflective element 14 of modulator 10 is positioned at an angle ∅ from the light output surface 26, parallel to the path of emitted light from light source 30 incident upon liquid crystal cell 12. During operation, a voltage is applied to liquid crystal cell 12, thereby spatially modulating the path of the light passing therethrough.

As illustrated in FIG. 3 with dashed lines, when no voltage is applied to cell 12, the unaltered transmission path of the light impinging thereupon would pass therethrough in a straight line. When a voltage is applied to the modulator, the light passing therethrough is spatially modulated and exits liquid crystal cell 12 in a split beam of light, composed of two independent beams of light as illustrated by the directional arrows in FIG. 3. One beam of light exiting the modulator is right-hand circularly polarized and the other beam of light is left-hand circularly polarized. Each beam of light travels in a specific directional path dependent upon this polarization. The first beam of light travels at a positive angle α to the unaltered transmission path of entering light, and the second beam of light travels at a negative angle α to the unaltered transmission path of entering light. As illustrated, the first beam of light travels in a directional path toward reflective element 14. This beam of light impinges upon reflective element at an angle α and is reflected by reflective element 14 at an equal angle α of reflection, thereby traveling in an equivalent directional path as the second beam of light. It should be understood that during operation, a plurality of light emitting devices are emitting light upon light input surface 28 of cell 12, thereby spatially modulating the light impinging thereupon and when utilized in a visual display system, creating a resultant integrated image that appears to be composed of a greater number of pixels than the light source.

Referring now to FIG. 4, illustrated is another configuration for transmissive liquid crystal modulator 10 of the present invention. Specifically, illustrated, is liquid crystal cell 12 having attached thereto, or integrally formed therewith, reflective element 14. Reflective element 14 is aligned substantially perpendicular to light output surface 26 of liquid crystal cell 12. As previously described, light source 30 is positioned to emit light parallel to the alignment of reflective element 14. Once the light passing therethrough is spatially modulated and a portion of the light is reflected by reflective element 14, all light travels in one directional path.

Referring now to FIG. 5, illustrated is yet another configuration of transmissive liquid crystal modulator 10 of the present invention. Specifically illustrated is liquid crystal cell 12, having spatially positioned relative thereto, reflective element 14. Reflective element 14 is positioned at a wide angle to cell 12, thereby requiring that light impinging thereupon to travel in a wide angle directional path. As illustrated by the directional arrows, the light emitted by light source 30, passes through liquid crystal cell 12 and is split into a first directional beam of light traveling toward reflective element 14 and a second directional beam of light traveling toward an output of the display system. The first directional beam of light is reflected by reflective element 14, at an angle equivalent to the angle of incidence, moreover in a directional path equivalent to the first directional beam of light, toward the output of the display system. The use of liquid crystal modulator 10 allows for the spatial modulation of substantially 100% of the light emitted by light source 30, although it should be understood that some small percentage of light, or energy, will be lost through reflection, diffraction or scattering.

Figure 6:
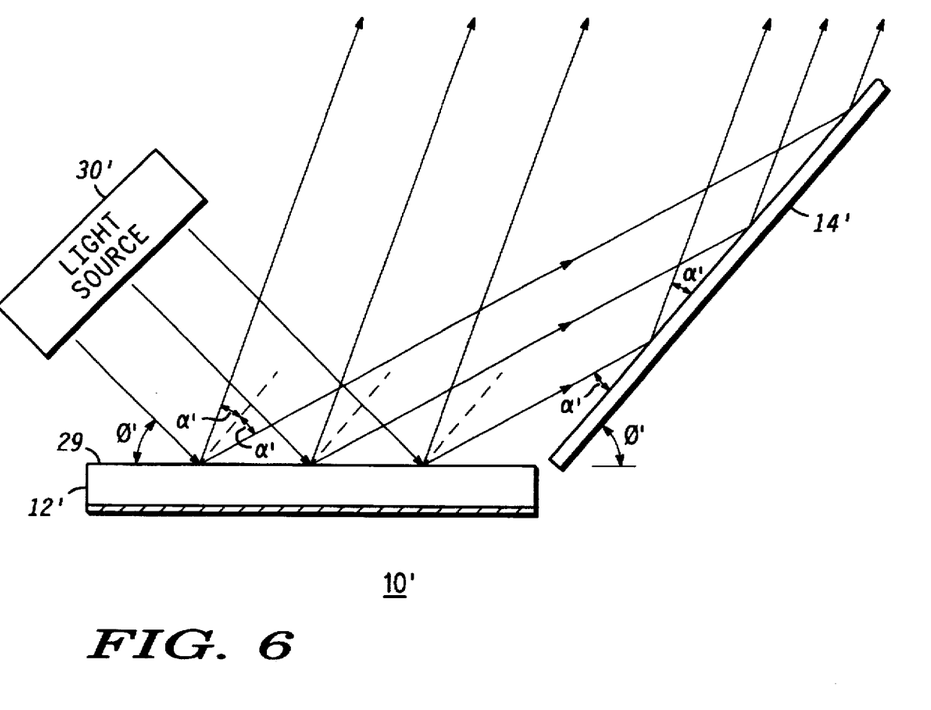
FIGS. 6, 7, and 8 are simplified schematic views of three configurations of the reflective chiral smectic liquid crystal modulator of the present invention illustrating the spatial modulation and resultant directional travel of light passing therethrough.
Figure 7:
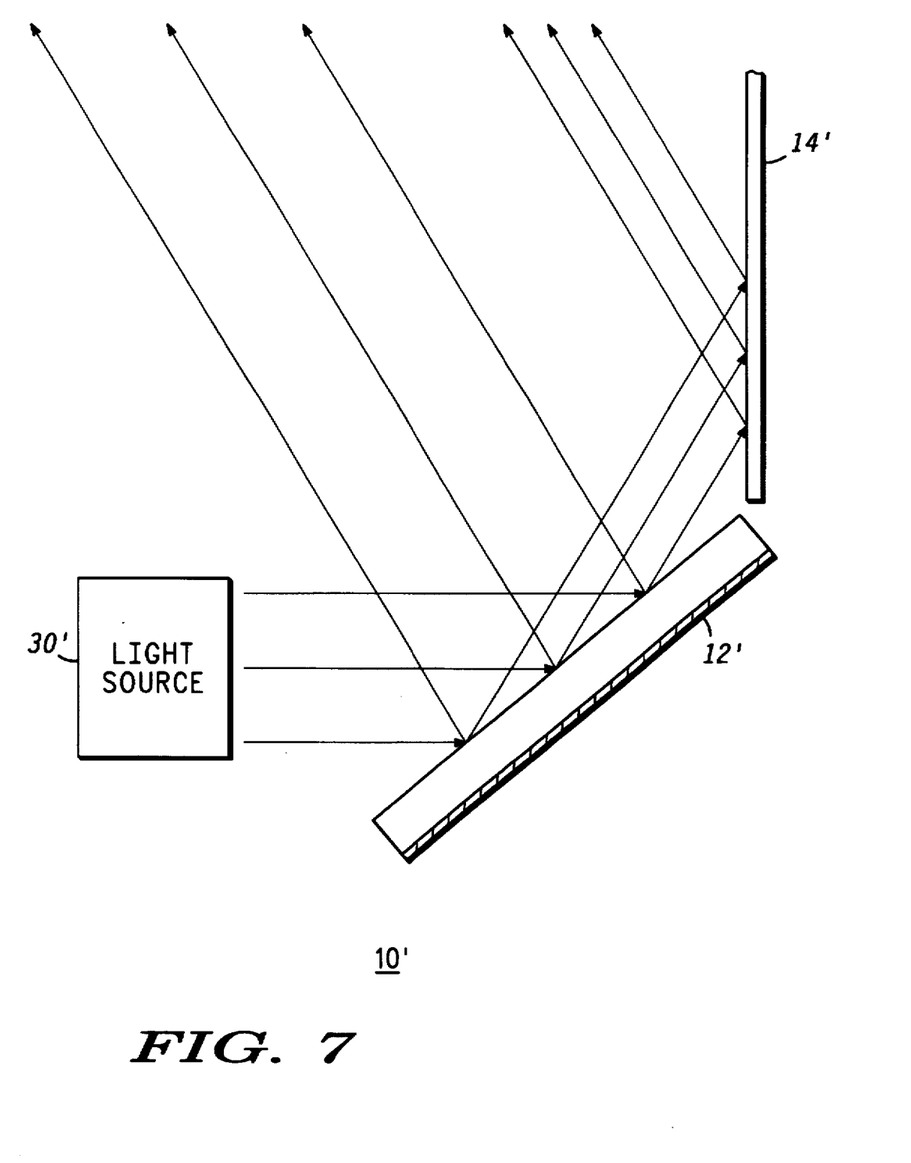
Figure 8:
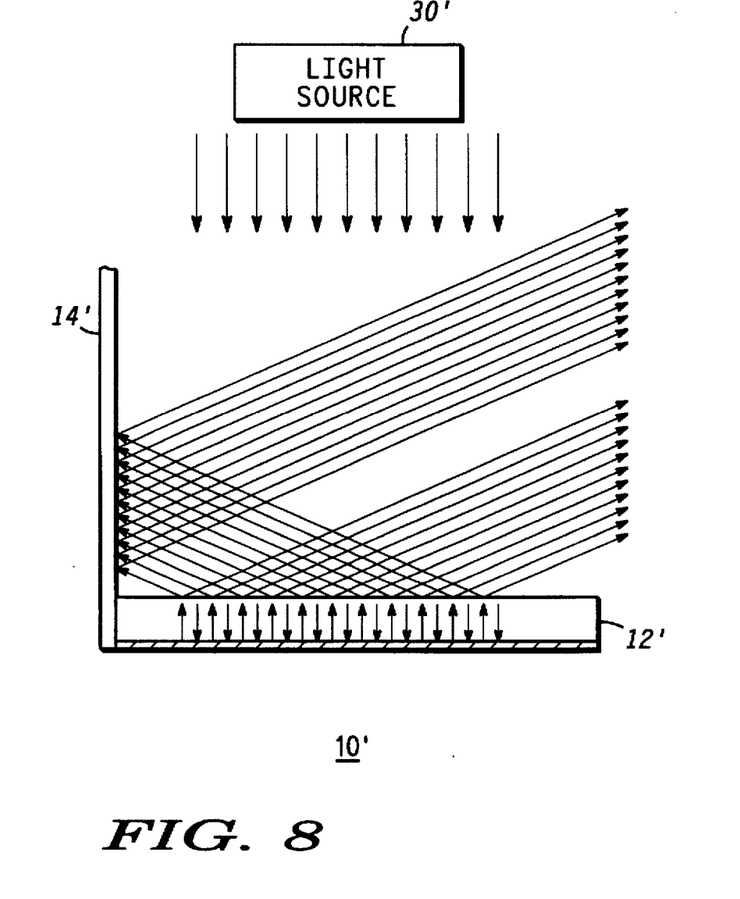

As previously stated, liquid crystal modulator 10 of the present invention is operable in a reflective mode, when liquid crystal cell 12 is configured having reflective properties. Referring now to FIGS. 6, 7, and 8, illustrated are varying configurations of a reflective liquid crystal modulator 10' of the present invention having spatially positioned thereto, a reflective element 14'. Again it should be noted that all components of the reflective liquid crystal modulator, similar to the components of the transmissive liquid crystal modulator, are designated with similar numbers, having a prime added to indicate the different embodiment. Reflective liquid crystal modulator 10' operates in a similar manner to transmissive liquid crystal modulator 10 described above, except in this embodiment, light emitted from a light source 30' enters and exits through the same light input/output surface 29 of liquid crystal cell 12'. Referring specifically to FIG. 6, illustrated is one configuration of the liquid crystal modulator 10' of the present invention. Modulator 10' is composed of reflective liquid crystal cell 12' and reflective element 14'. As illustrated, light source 30' is positioned within a visual display (not shown) so that light emitted by the image source has an angle of incidence ∅' with light input/output surface 29 of liquid crystal cell 12'. As illustrated with dashed lines, when no voltage is applied to cell 12', light impinging upon liquid crystal cell 12' and reflected back through liquid crystal cell 12' would travel in the directional path shown. When a voltage is applied, the light entering and reflecting back through cell 12' is spatially modulated and exits liquid crystal cell 12' in a split beam of light, composed of two independent beams of light as illustrated by the directional arrows in FIG. 6. Each beam of light travels in a specific directional path. A first beam of light travels at a negative angle $\alpha'$ to the unaltered transmission path of entering light, and a second beam of light travels at a positive angle $\alpha'$ to the unaltered transmission path of entering light. As illustrated, the first beam of light travels in a directional path toward reflective element 14'. This beam of light impinges upon reflective element 14' at an angle $\alpha'$ and is reflected by reflective element 14' at an equal angle $\alpha'$ of reflection, thereby traveling in an equivalent directional path as the second beam of light.

Similar configurations of modulator 10' are illustrated in FIGS. 7 and 8. As illustrated in FIG. 7, reflective element 14' is attached to liquid crystal cell 12' at a wide angle. As illustrated in FIG. 8, reflective element 14' is attached to liquid crystal cell 12' at a 90° angle to the light input/output surface 29 of liquid crystal cell 12'. As illustrated, subsequent to passing through liquid crystal cell 12', two light beams are emitted, the first impinging upon reflective element 14', where it is reflected back in a directional path equivalent to the second beam of emitted light.

It should be understood that the liquid crystal phase spatial light modulator of the present invention is intended for use in an electro-optical system in which the steering of unpolarized light is desired. More specifically, the liquid crystal phase spatial light modulator is intended for use in miniature visual display systems, target tracking devices, weaponry, optical communications devices, optical computing devices, optical storage devices, printing devices, image scanning devices, or the like. During use and operation in a visual display system, a resultant integrated image is generated by the system, composed of the image source or light emitting device, the phase spatial light modulator, driver/control circuits and various optical elements. The resultant integrated image is too small to properly perceive (fully understand) with the human eye and generally requires a magnification of at least 4× for comfortable and complete viewing. Several examples of optical magnification systems which may have incorporated therewith the chiral smectic liquid crystal phase spatial light modulator of the present invention when incorporated into a visual display system are illustrated in FIGS. 9 through 13, explained below.

Figure 9:
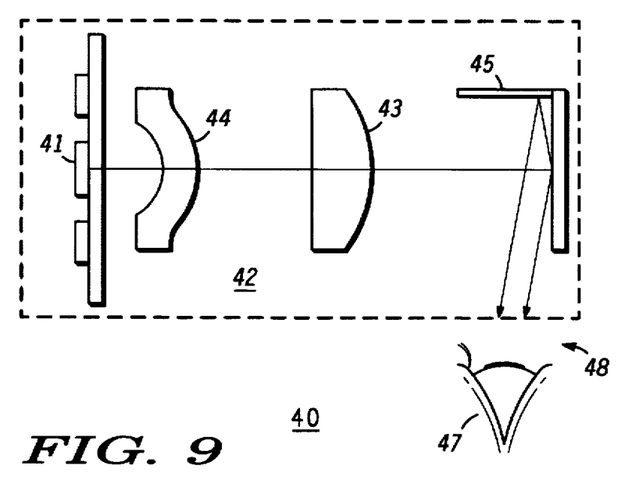
FIG. 9 is a simplified schematic view of a miniature visual image display incorporating the liquid crystal modulator of the present invention.

Referring to FIG. 9, a miniature visual image display 40 is illustrated in a simplified schematic view. Miniature visual image display 40 is defined by housing 42 and includes an image generation apparatus 41 for providing an image. An optical magnification system, represented by optical elements 44,43 and is positioned in spaced relation to image generation apparatus 41 of miniature visual image display 40. A reflective phase spatial light modulator 45, generally similar to reflective liquid crystal modulator 10', previously described, is positioned to allow the light emitted by image generation apparatus 41 to be spatially modulated and produce a high resolution resultant integrated image viewable by an eye 47 spaced from an aperture 48. It should be understood that a transmissive liquid crystal modulator, generally similar to modulator 10 previously described, could alternatively be utilized in miniature visual image display 40.

In operation, the light generated by image generation apparatus 41 passes through optical elements 43 and 44 and modulator 45. Varying external voltages are applied to modulator 45, thereby resulting in a scanning effect of the light emitted by a plurality light emitting devices of image generation apparatus 41. The resultant integrated image viewable by the eye 47 of the observer through aperture 48 appears to have a greater number of pixels and an increased fill factor, even though the number of pixels of the image generation apparatus 41 remains the same.

Optical elements 43 and 44, represented schematically by a plurality of optical elements mounted in spaced relation from image generation apparatus 41, receive the image from image generation apparatus 41 and magnify it an additional predetermined amount. It will of course be understood that the magnification and/or correction can be provided by any number or type of optical element and may be adjustable for focus and additional magnification, if desired, or may be fixed in a separate housing for simplicity. It should be noted that additional optical elements can be provided exterior the miniature visual image display 40 for further image magnification and/or correction.

Figure 10:
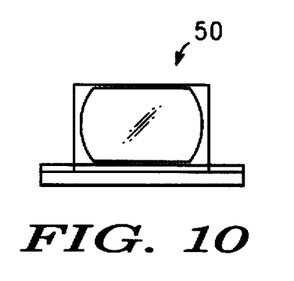
FIGS. 10, 11 and 12 illustrate a front view, side elevational view, and a top plan, respectively, of a visual image display apparatus utilizing the liquid crystal modulator of the present invention.
Figure 11:
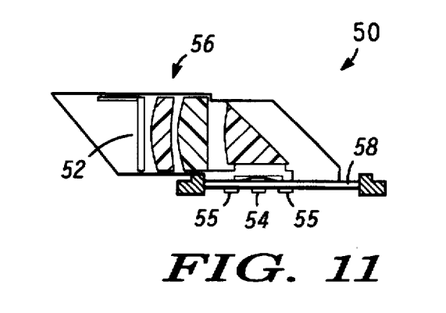
Figure 12:
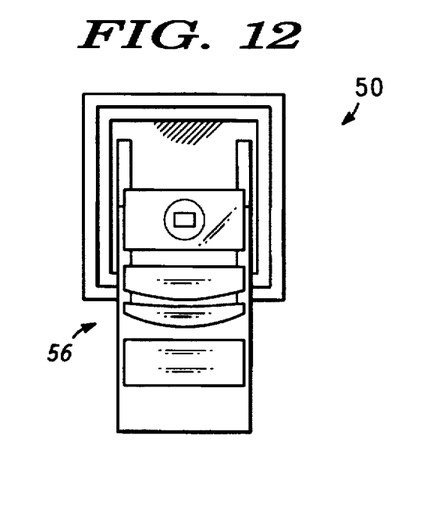

Referring now to FIGS. 10, 11 and 12, another miniature visual image display 50, in accordance with the present invention, is illustrated in a front view, side elevational view, and top plan, respectively. FIGS. 10, 11 and 12 illustrate miniature visual image display 50 approximately the actual size to provide an indication as to the extent of the reduction in size achieved by the present invention. Miniature visual image display 50 includes a transmissive chiral smectic liquid crystal phase spatial light modulator 52, hereinafter referred to as liquid crystal modulator 52, (generally similar to liquid crystal modulator 10, described above), an image generation apparatus 54, a plurality of driver/control circuits 55, and a plurality of optical elements, which comprise an optical magnification system 56. It should be understood that a reflective liquid crystal modulator, generally similar to liquid crystal modulator 10' described above, could alternatively be utilized in miniature visual image display 50 with minor modifications to the display 50.

Image generation apparatus 54 is mounted in electrical interface with a standard printed circuit board 58. Transmissive liquid crystal phase spatial light modulator 52 is mounted in optical alignment with optical magnification system 56, thereby allowing the light emitted by image generation apparatus 54 to pass through optical magnification system 56 prior to passing through liquid crystal modulator 52 when exiting the folded optical magnifier formed by optical magnification system 56.

Figure 13:
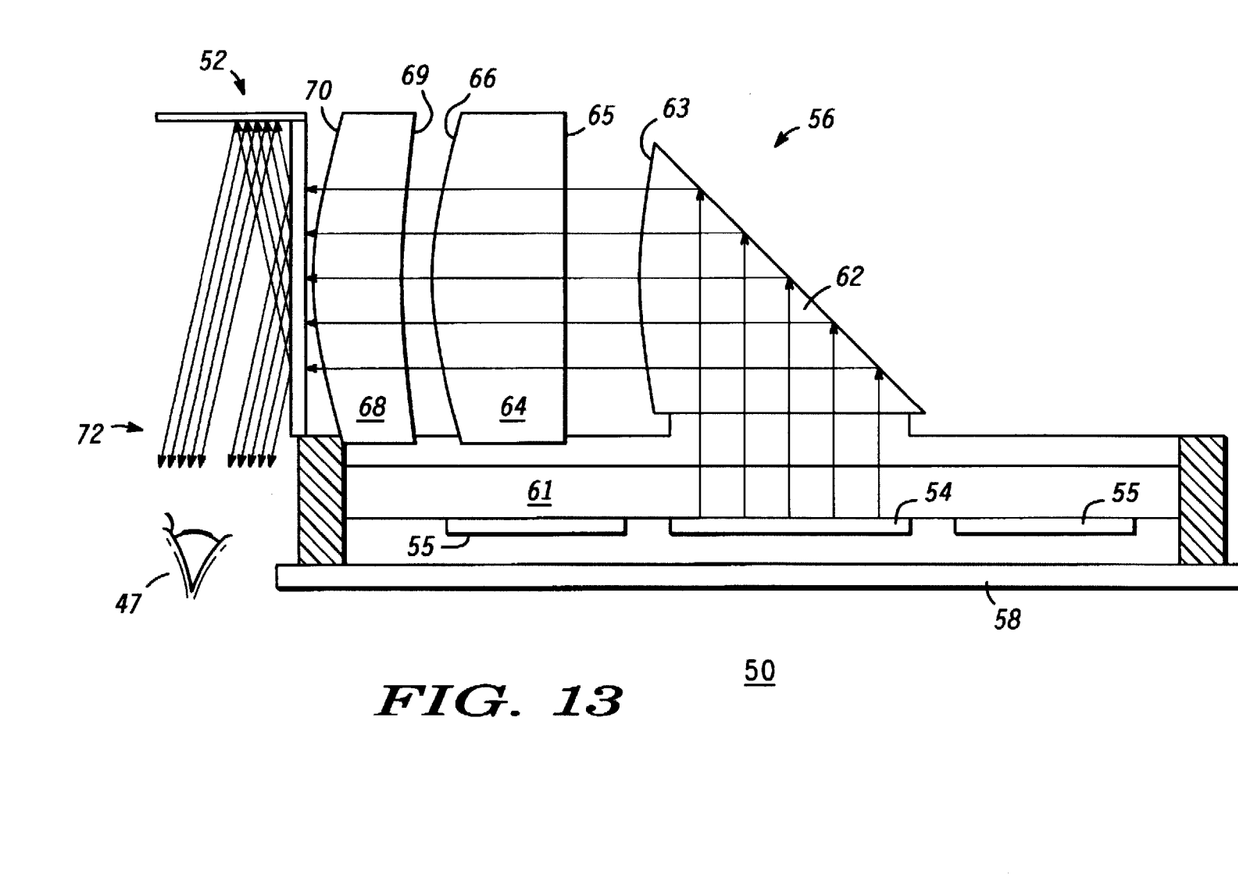
FIG. 13 is a 4× magnified view in side elevation of the apparatus of FIG. 10 utilizing the chiral smectic liquid crystal modulator of the present invention, illustrating the directional travel of light passing through the apparatus.

Referring specifically to FIG. 13, a 4× magnified view in side elevation of miniature visual image display 50 of FIG. 9 is illustrated for clarity. From this view it can be seen that optical magnification system 56 is composed of an optical prism 62 so that the image generated by an image generation apparatus 54 passes through optical prism 62 and through a refractive surface 63. The image is then directed to an optical lens 64 having a refractive inlet surface 65 and a refractive outlet surface 66. From optical lens 64 the image is directed to an optical lens 68 having an inlet refractive surface 69 and an outlet refractive surface 70. Also, in this embodiment at least one diffractive optical element is provided on one of the surfaces, e.g. refractive inlet surface 65, to correct for chromatic and other aberrations. A transmissive liquid crystal modulator 52 is positioned to allow light generated by image generation apparatus 54 to pass therethrough, and operate as previously described in conjunction with liquid crystal modulator 10. The operator looks into an aperture 72 and sees a large, easily discernible enhanced resolution visual image which appears to be behind miniature visual image display 50.

It is anticipated by this disclosure that the plurality of optical elements disclosed in FIGS. 9-13, include reflective elements, refractive elements, diffractive elements, polarizers, diffusers, or holographic lenses that may be mounted in overlying relationship to the image generation apparatus, specifically positioned on an interior aspect of the optical magnifiers It is further disclosed that a plurality of optical elements, including reflective elements, refractive elements, diffractive elements or diffusers may be mounted in overlying relationship to the surface of the optical magnifier through which the light, or resultant integrated image, is output, specifically positioned on an exterior aspect of a light output surface, to form an image plane for the light which forms the resultant integrated image.

Chiral smectic liquid crystal phase modulator 10 and 10' of the present invention are meant to be incorporated into any number of varying electro-optical systems, some of which were previously described. It should be understood that the placement of the liquid crystal modulator in relation to the light source and optical elements (if required) is dependent upon the desired result and mode of operation. These types of electro-optical systems are ultimately intended for use in various types of electronic equipment, namely visual display systems utilized in portable communications equipment, such as cellular and portable telephones, and pagers, as well as other types of electronic devices, such as smart-card reader devices, target tracking devices, weaponry, optical communications devices, optical computing devices, optical storage devices, printing devices, image scanning devices, or the like.

Thus, a new and improved chiral smectic liquid crystal phase spatial light modulator composed of a liquid crystal cell and a reflective element which serves to spatially modulate the phase of light emitted by a light emitting device is disclosed which is relatively easy and inexpensive to manufacture. The liquid crystal phase spatial light modulator of the present invention is intended for use in electro-optical systems in which beam steering is sought. The electro-optical system components ruggedly mount a light source, the liquid crystal phase spatial light modulator scanning device, and optional optical components, while conveniently integrating electrical connections to the components and providing external connections thereto. Light sources, polarizers, diffusers and, if desired, additional optics are conveniently integrated into the small electro-optical system which in a visual display system is easily integrated into a housing, forming an optical magnifier, for use in portable electronic equipment. It is further disclosed that additional optical elements, such as polarizer plates or layers, refractive elements, diffractive elements, etc. may be easily positioned exterior the housing of a visual display system. By using light emitting devices for the light source, with low fill factors, which are scanned by the liquid crystal phase spatial light modulator to generate a change in directional path of the light passing therethrough, the size of the system is further reduced and the electrical power required is also minimized.

While we have shown and described specific embodiments of the present invention, further modifications and improvement will occur to those skilled in the art. We desire it to be understood, therefore, that this invention is not limited to the particular forms shown and we intend in the appended claims to cover all modifications that do not depart from the spirit and scope of this invention.

What is claimed is:

1. An electro-optical system comprising:
    a light source, comprised of a plurality of light emitting devices, each of the light emitting devices capable of emitting unpolarized light;
    a phase spatial light modulator, composed of a liquid crystal cell, including a light output surface, defining at least one phase spatial light modulator pixel, and a reflective element positioned at an angle $\emptyset$ to the light output surface of the liquid crystal cell, the liquid crystal cell positioned to receive, and modulate the unpolarized light emitted by the plurality of light emitting devices, the modulated light passing therethrough the liquid crystal cell, the reflective element positioned to reflect a portion of the unpolarized light modulated by the liquid crystal cell and passing therethrough the liquid crystal cell; and
    a plurality of driver/control circuits connected to the plurality of light emitting devices and a plurality of driver/control circuits connected to the liquid crystal cell of the phase spatial light modulator for delivering a voltage across the liquid crystal cell of the phase spatial light modulator, thereby changing the phase of the unpolarized light emitted by the light emitting devices, thus generating a resultant change in directional path of the light.

2. An electro-optical system as claimed in claim 1 wherein the light emitting devices include one of inorganic light emitting diodes, organic light emitting diodes, field emission displays, cathode ray tubes, vertical cavity surface emitting lasers, and electroluminescent devices.

3. An electro-optical system as claimed in claim 2 wherein the phase spatial light modulator includes a liquid crystal material.

4. An electro-optical system as claimed in claim 3 wherein the liquid crystal material is chiral smectic liquid crystal material.

5. An electro-optical system as claimed in claim 4 wherein the liquid crystal cell of the phase spatial light modulator includes a substrate, electrically conductive material, at least one molecular alignment layer, a tubular glass spacer, and liquid crystal material.

6. An electro-optical system as claimed in claim 5 wherein the liquid crystal material contained within the liquid crystal cell of the phase spatial light modulator is positioned in a continuous layer across the liquid crystal cell and each control circuit of the liquid crystal cell includes at least one contact and at least one optically clear contact positioned on an opposite surface of the continuous layer of liquid crystal material with the at least one contact and the at least one optically clear contact defining a pixel within the continuous layer.

7. An electro-optical system as claimed in claim 6 wherein the liquid crystal cell is fabricated to be one of a single pixel and an array of pixels.

8. An electro-optical system as claimed in claim 7 wherein the plurality of light emitting devices of the light source are formed in a two-dimensional array.

9. An electro-optical system as claimed in claim 8 wherein the at least one contact of the liquid crystal cell is optically clear, thereby allowing the unpolarized light emitted by the light source to pass therethrough, and the liquid crystal cell to operate in a transmissive mode.

10. An electro-optical system as claimed in claim 8 wherein the at least one contact of one of the liquid crystal cell is formed of a reflective metal, thereby allowing the liquid crystal cell to operate in a reflective mode.

11. An electro-optical system comprising:

a light source, comprised of a plurality of light emitting devices, each of the light emitting devices capable of emitting unpolarized light;

a liquid crystal phase spatial light modulator, comprised of a liquid crystal cell, formed of a substrate and including a control circuit formed in the substrate, the control circuit including control terminals adjacent an outer edge of the substrate, at least one molecular alignment layer, electrically conductive material forming the control circuit of the liquid crystal cell, and a continuous layer of liquid crystal material positioned so that light passing into the liquid crystal phase spatial light modulator passes through the liquid crystal material, that when having a voltage applied thereto, causes a change in phase of the light passing therethrough and a reflective element aligned at a positive angle Ø relative to a light output surface of the liquid crystal cell, to reflect light exiting through the liquid crystal cell;

a housing, defining an optical magnifier, having a light input and a light output, the liquid crystal phase spatial light modulator and the light source being mounted within the housing, the housing thereby encapsulating the liquid crystal phase spatial light modulator and the light source; and an optical magnification system, comprised of a plurality of optical elements, positioned so that light is directed through the optical magnification system and through the liquid crystal phase spatial light modulator, thereby generating a change in directional path of the light emitted by the light source.

12. An electro-optical system as claimed in claim 11 wherein the change in directional path of the light emitted by the light source generates a resultant integrated image viewable by an observer as one of a direct view image, a miniature virtual image, and a projected image.

13. An electro-optical system as claimed in claim 12 wherein the liquid crystal cell of the liquid crystal phase spatial light modulator is formed of an optically transparent material, thereby scanning the unpolarized light emitted by the light emitting display device, and emitting a therethrough a split beam of light of a different phase, one beam of light impinging upon the reflective element, thus operating in a transmissive mode.

14. An electro-optical system as claimed in claim 12 wherein one of the liquid crystal cell of the liquid crystal phase spatial light modulator is fabricated to include a reflective material, thereby scanning the unpolarized light emitted by the light emitting display device as it enters the liquid crystal phase spatial light modulator, and reflecting the light back through the liquid crystal phase spatial light modulator, thereby emitting a split beam of light having undergone at least two phase changes, one beam of light impinging upon the reflective element, thus operating in a reflective mode.

15. An electro-optical system as claimed in claim 12 wherein the plurality of optical elements are molded, thereby forming a portion of the housing.

16. An electro-optical system as claimed in claim 12 wherein the plurality of optical elements are positioned within the housing.

* * * * *